United States Patent [19]
Lepitre

[11] Patent Number: 5,881,066
[45] Date of Patent: Mar. 9, 1999

[54] SYSTEM FOR TESTING A TRANSMISSION LINK

[76] Inventor: Didier Lepitre, 94, rue Broca, 75013 Paris, France

[21] Appl. No.: 607,958

[22] Filed: Feb. 29, 1996

[30] Foreign Application Priority Data

Mar. 1, 1995 [FR] France .................................. 95 02371

[51] Int. Cl.⁶ ............................ G01R 31/28; G11B 27/00
[52] U.S. Cl. .......................... 371/20.5; 371/61; 375/222; 375/224
[58] Field of Search .................................. 371/20.5, 20.1, 371/34, 42, 47.1, 61, 62; 375/221, 222, 224, 225, 226, 354, 355, 358, 376, 377; 370/249, 468, 276, 282; 379/5, 93, 377; 395/551, 552, 555, 556, 558

[56] References Cited

U.S. PATENT DOCUMENTS

| | | | |
|---|---|---|---|
| 3,743,938 | 7/1973 | Davis | 375/224 |
| 4,849,997 | 7/1989 | Suzuki et al. | 375/371 |
| 5,099,477 | 3/1992 | Taniguchi et al. | 370/501 |
| 5,111,451 | 5/1992 | Piasecki et al. | 370/294 |
| 5,384,806 | 1/1995 | Agazzi | 375/222 |
| 5,586,123 | 12/1996 | Baker | 371/20.5 |

FOREIGN PATENT DOCUMENTS 2631194  5/1988  France .

*Primary Examiner*—Trinh L. Tu
*Attorney, Agent, or Firm*—Venable, Baetjer, Howard & Civiletti, LLP

[57] ABSTRACT

A system for testing a data transmission link between first and second terminal devices such as modems. The first terminal device transmits a test data sequence which it is received at an output access (20) of the second terminal device. That device also has an input access (21), first and second clocks which set the timing of data at the input and output accesses, and a loop-back circuit for connecting the output access to the input access to retransmit a received test sequence back to the first terminal device. Since different modems often operate at different data rates, the input and output clock rates may differ. However, during loop-back operation the clocks must be synchronized in order to avoid loss of data. Accordingly, the second terminal device includes a microprocessor for bringing the first and second clocks into synchronism to enable loop-back operation, and a memory which stores the portion of a test sequence which is received from the first terminal device while the clocks are still being synchronized.

9 Claims, 3 Drawing Sheets

SYSTEM FOR TESTING A TRANSMISSION LINK

FIELD OF THE INVENTION

The present invention relates to a test system for testing a transmission link which comprises at least a first and a second terminal device, in which system the first terminal device is coupled to a transmitting device for transmitting a test sequence, there is provided a transmission medium for connecting the terminal devices, the second terminal device having an input access and an output access for being connected to a user circuit comprises:

a first clock determining the timing of the data to be supplied to said input access, a second clock input for determining the timing of the data received on the input access, a loop-back circuit for connecting said input and output accesses.

The invention likewise relates to the modems that may constitute said terminal devices.

BACKGROUND OF THE INVENTION

For testing the proper operation of the modems, they are known to be looped back. With respect to this subject, reference be made to patent application Ser. No. 2,631,194 filed in France on 6 May 1988.

One of the problems that occurs during these loop-back operations is due to the independence of the transmitting and receiving clocks. Indeed, it is essential that the loop-back does not cause loop-back data to be lost. They may even be lost for a phase jump of less than $T_2$ (T being the period of the clock signals) which occurs when these loop-back data are relayed. This loss appears of necessity for minor modulations of the type recommended by the V0.34 standard and leads to resynchronizations. At a high rate, according to this standard, a phase jump of only several degrees may cause a resynchronization to occur.

SUMMARY OF THE INVENTION

The present invention proposes a system of the type described in the paragraph of Field of the Invention, which permits of this looping back without the occurrence of a resynchronization process.

Therefore, such a system is characterized in that means are provided which are used during the test for synchronizing said clocks and in that the loop-back circuit comprises a memory device for storing at least part of the test sequence while the transmitting and receiving clocks are being brought in synchronism.

These and other aspects of the invention will be apparent from and elucidated with reference to the embodiments described hereinafter.

DESCRIPTION OF PREFERRED EMBODIMENTS

Figure 1:
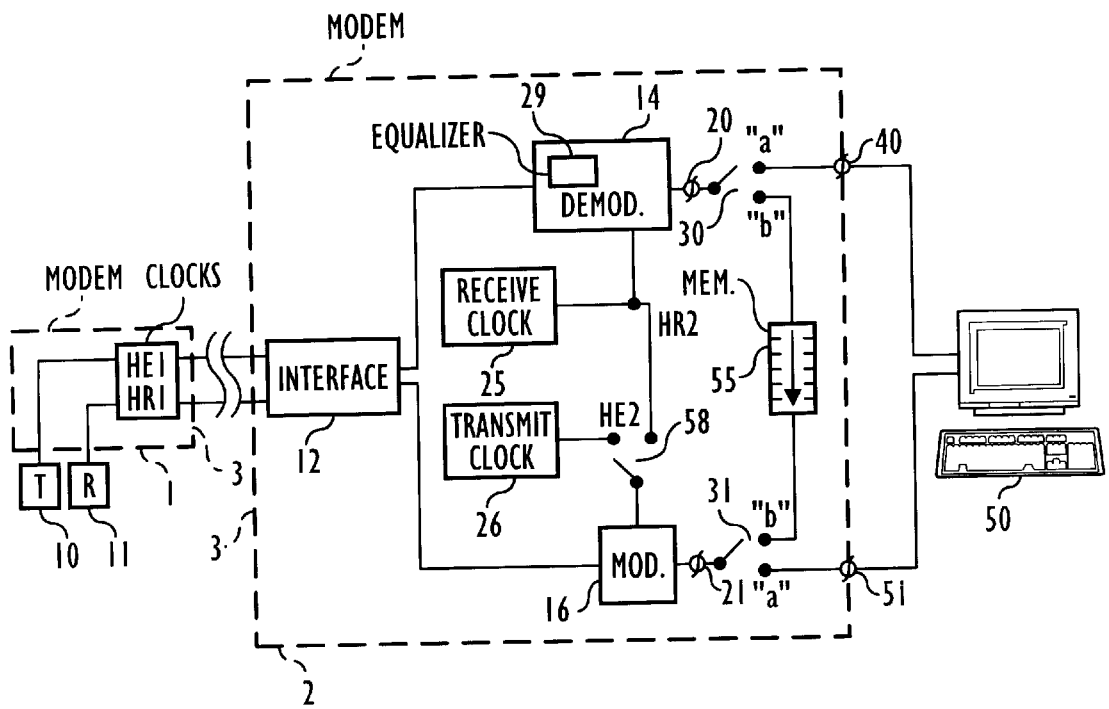
FIG. 1 shows a system according to the invention.

The system shown in FIG. 1 comprises a first terminal device constituted by a modem 1 which communicates with a second terminal device constituted by a modem 2. These modems 1 and 2 are connected by a telephone network 3. In FIG. 1 are shown the elements of modem 2 necessary for implementing the invention. This modem comprises an interface circuit 12 which forms a connecting link between the telephone network 3 and a demodulation circuit 14 and also between the telephone network 3 and a modulation circuit 16. The demodulated data appear on a terminal 20 connected to the output of the demodulation circuit 14 and the transmit data are applied to an access 21 connected to the input of the modulation circuit 16. Clocks 25 and 26 produce respectively, signals HR2 and HE2 which control reception and transmission of the modulated data on the telephone network 3. The demodulation circuit 14 of modem 2 may comprise a transversal adaptive equalizer 29. This equalizer weights replicas of the received data, shifted in time with a set of coefficients. These coefficients are adjusted in such a way that the value of the data on its output comes near to one of the threshold values considered to be exact values of the transmitted data. This equalizer need not be described in more detail, because it forms part of prior-art equalizers.

The first modem 1 allows pieces of test equipment 10, 11 to test the whole transmission link and particularly modem 2. Equipment 10 transmits test sequences and equipment 11 examines the sequences on their return for their test sequences to determine the proper state of the link. One of the tests consists of having the remote modem form a closed loop. For making the test of modem 2, feedback means are provided from the output 20 of the modem to its input 21. These feedback means are formed, in essence, by switches 30 and 31 which have two positions "a" and "b". In normal operation, these switches are set in their "a" position and connect, on the one hand, the output 20 to a link access 40 for accessing a terminal 50 and, on the other hand, input 21 to another access 50 for the output of terminal 50. During a test period, the switches are set to the "b" position, so that the output 20 is connected according to a measure of the invention to the input 21 via a memory 55 of a type known by the name of FIFO memory (first-in, first out).

In normal operation, the data coming from modem 1, are transmitted onto the network 3 at a rate defined by the signals HE1 made by the transmitting clock of modem 1 (not shown in the drawing FIGS.). The receiving clock of modem 2 is synchronized by the data transmitted by the telephone network 3. These data are then used by the terminal 50. This terminal sends data to access 51 in response to the messages it receives. The transmission rate of the return data of terminal 50 on the telephone network is determined by the transmitting clock 26. These data are finally received at modem 1 and synchronize a receiving clock which produces signals HR1.

The problem posed comes from the looping back decided by modem 1.

Before the loop-back, there generally holds:

HR2≠HE2

In order not to lose data, it should be HR2=HE2.

An additional requirement given by the V0.34 standard of CCITT is also necessary, which prohibits making the phase of the clock signals vary too precipitously, which cannot be tolerated for the modulations of this standard and would profoundly disturb the operations of modems 1 and 2.

To solve this problem, the invention proposes:
  to make the frequency and/or phase of the clock 25 vary so that it can be slaved to the frequency and/or the phase of clock 26, and to replace clock 26 by clock 25 via a switch 58 once a phase correspondence of these two clocks has been detected;
  while this phase is being synchronized, to store the loop-back data in the memory 55. The unwanted phenomena which could occur during the synchronization phase are suppressed by the presence of the transversal adaptive equalizer 29.

Figure 2:
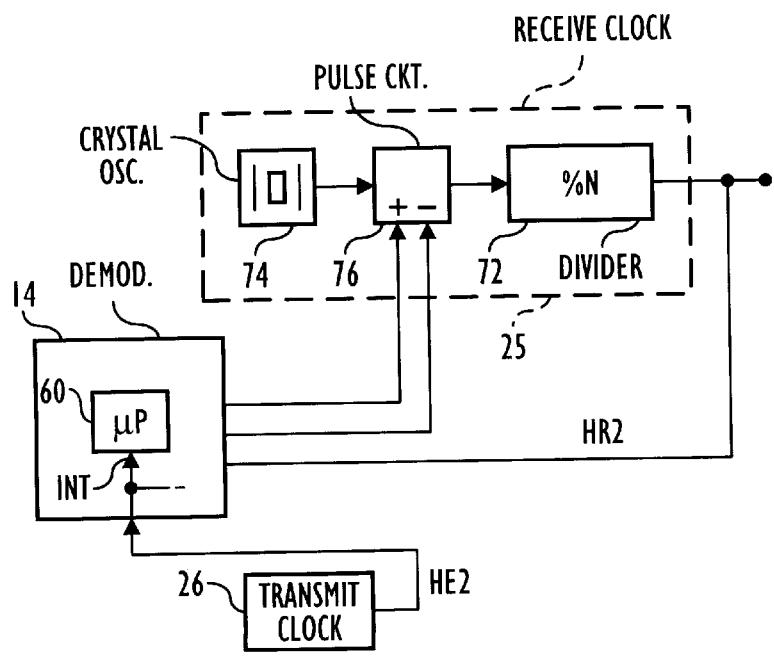
FIG. 2 shows in detail a second terminal device which forms part of the system shown in FIG. 1, FIGS. 3 and 4 represent flow charts explaining the operation of the system according to the invention.

FIG. 2 shows an example of the implementation of the invention. The demodulation circuit 14 is realized by a microprocessor 60. This microprocessor 60 has an input INT for receiving interrupt signals that come from the transmitting clock 26. During the slaving phase, this microprocessor 60 can send signals for slowing down or accelerating the receiving clock 25. In fact, the acceleration consists of adding a pulse to the signal that is produced by a high-frequency quartz crystal 74 prior to the division performed by a divider 72 and the slowing down consists of suppressing a pulse from this quartz crystal. A pulse adding/suppression circuit 76 executes these operations. It has an input (+) for adding a pulse and an (−) for removing a pulse.

Figure 3:
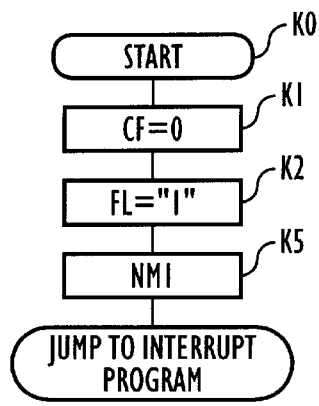
Figure 4:
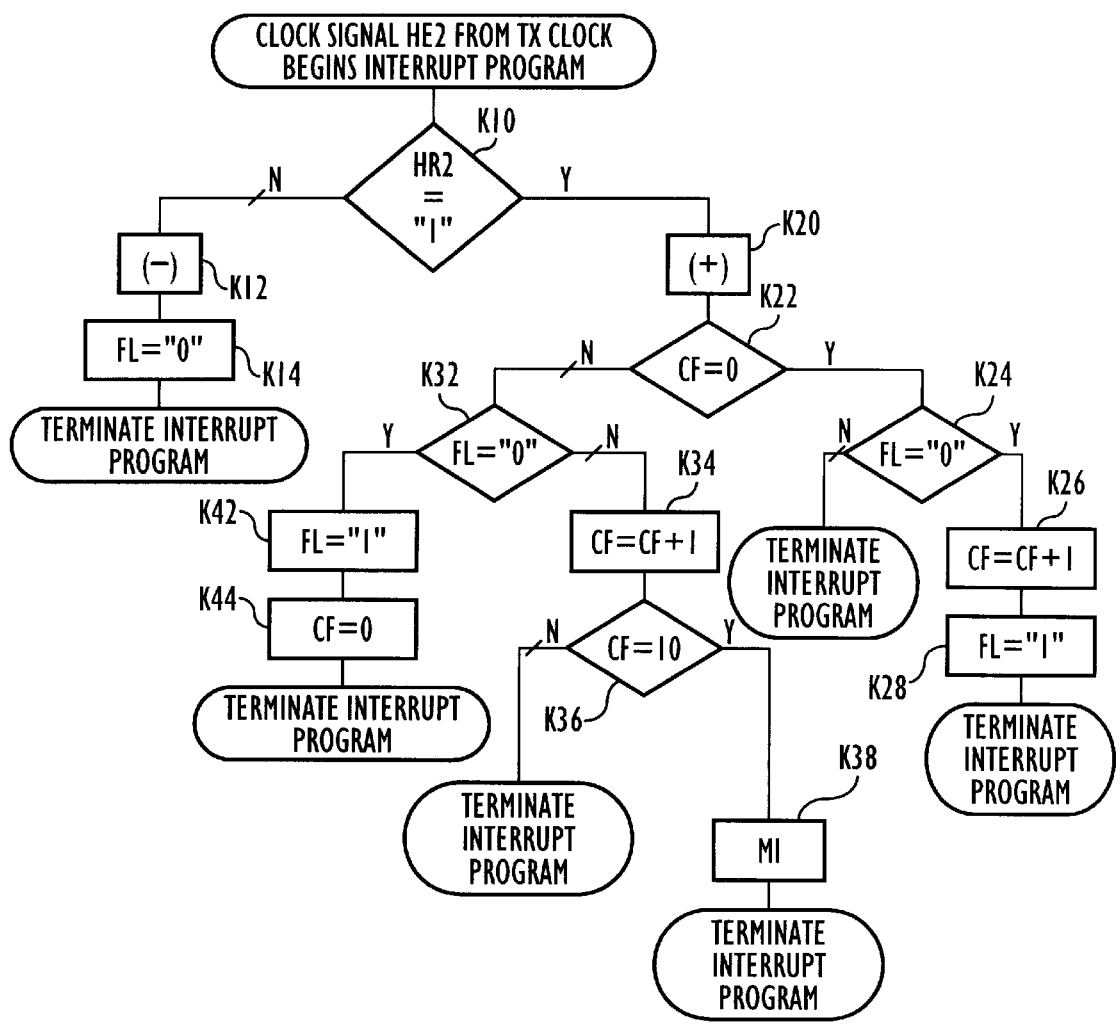

In order to effect this slave control, the microprocessor 60 is programmed in a manner indicated by the flow charts of FIGS. 3 and 4.

The flow chart of FIG. 3 is the initialization phase and starts at box K0 which indicates the test of check program detected by modem 2. Boxes K1 and K2, which follow, show the initialization of a counter CF and of a flag FL which is set to the value "1". Box K5 indicates that the interrupt signals applied to input INT of the microprocessor are taken into account.

Figure 5A:
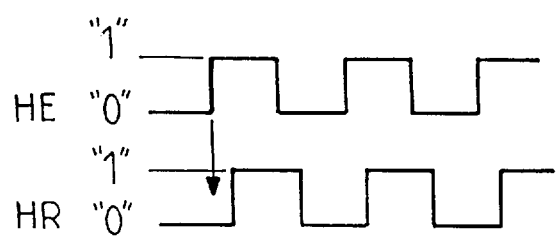
FIG. 5A and FIG. 5B show two different relative phase conditions of the signals of the first and second clocks of the terminal device shown in FIG. 2.
Figure 5B:
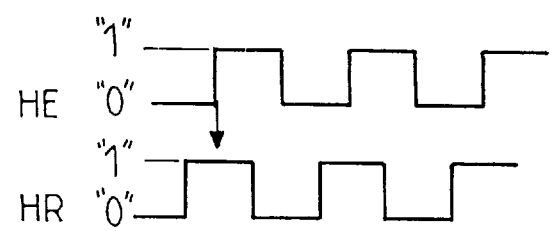

The operations shown by the flow chart of FIG. 4 are thus triggered by the clock signals HE2 and, more precisely, by the rising edge of these signals. The first operation (box K10) thus consists of examining the logic level of the signal HR2. If its value is "0", one is confronted with the case shown in FIG. 5A. There is thus considered that the signal HR2 leads over signal HE2, so HR2 is to be slowed down. Therefore, box K12 is proceeded to, where indicated that one pulse is removed and from there box K14 is proceeded to, where the flag FL is set to "0". The interrupt program is the terminated while a next rising edge a next rising edge of the signal HE2 is waited for. If the test of box K10 shows a value of HR2 equal to "1", one is confronted with the case represented in FIG. 5B. There is then considered that the signal HR2 is lagging with respect to signal HE2 and that it is thus suitable to advance signal HR2. Therefore, box K20 is proceeded to, where there is indicated that a pulse is added and, from there, box 22 is proceeded to, where the value of counter CF is tested. If this value is zero, then the value of the flag FL is tested in box K24. If this value is "0", the contents of the counter are incremented by unity (box K26) and the flag is set to the value "1" (box K28). The interrupt program is then stopped. This program is also stopped if the test indicated in box K24 shows a different value from "0" for the flag FL; this value cannot be but "1". The test of box K22 may show that the counter CF has a different value from 0. Then, in box K32 a test is made of the value of flag FL. If this value is different from "0", the counter CF is incremented by unity (box K34). If this value is equal to, for example, 10, which is given in box K36, there is estimated that the synchronization is effective and that the process need not be continued. Therefore, the interruption is masked so that interrupt program will no longer be triggered (box K38). If the test of box K36 shows a value CF different from "0", thus of necessity below 10, the interrupt program is stopped and a next edge of the signal HE2 is waited for. The test of box K32 may indicate that the flag value is "30" when in that case the values of FL and CF are re-initialized in boxes K42 and K44.

Thus, by this mode of operation there is ensured that when the transmitting clock is substituted fro the receiving clock, there will be no difference of phase smaller than a half clock period. This residual phase error will be smaller as the frequency of the quartz crystal is higher (for example, 36.864 MHz) and as the division will be made at a higher rate (5000) for a count of CF=10 (box K36). The order of error Erφ of this phase can be estimated.

$$Er\phi = \tfrac{1}{5000} = \tfrac{1}{500} \text{ period.}$$

I claim:
1. A modem comprising:
  an input access and an output access, each being for use in connecting to a circuit external to said modem;
  a first clock for determining the timing of data to be supplied to said input access;
  a second clock for determining the timing of data received at the output access;
  a loop-back circuit which can be activated to interconnect said input and output accesses;
  a clock synchronization circuit for synchronizing said clocks when said loop-back circuit is activated; and
  a memory for storing at least part of the data received at the output access while said clocks are being brought into synchronism by said clock synchronization circuit.

2. The modem claimed in claim 1, wherein the first and second clocks respectively provide first and second binary clock signals and the clock synchronization circuit includes means for establishing a stable phase relationship between edges of said first and second clock signals.

3. The modem claimed in claim 2, wherein said means for establishing a stable phase relationship between edges of said first and second clock signals comprises:
  means for detecting the binary logic value of the first clock signal upon occurrence of an edge of the second clock signal;
  means for delaying or advancing the second clock signal, depending on the detected binary logic value of the first clock signal;
  means for counting the number of times said detected binary logic value remains the same following occurrence of each of a series of successive edges of the second clock signal; and
  means for declaring that said stable phase relationship has been established when said number of times reaches a predetermined value.

4. A method for use in testing a modem, said modem including:
  an input access and an output access, each being for use in connecting to a circuit external to said modem;
  a first clock for determining the timing of data to be supplied to said input access;
  a second clock for determining the timing of data received at the output access; and
  a loop-back circuit which can be activated to interconnect said input and output accesses;
  said method being characterized by the steps of:
    synchronizing said clocks when said loop-back circuit is activated; and storing at least a part of the data received at the output access while said clocks are being brought into synchronism.

5. The method claimed in claim 4 wherein the first and second clocks respectively provide first and second binary clock signals and said synchronization step includes the step of establishing a stable phase relationship between edges of said first and second clock signals.

6. The method claimed in claim 5, wherein said step of establishing a stable phase relationship between the edges of said first and second clock signals comprises the steps of:

detecting the binary logic value of the first clock signal upon occurrence of an edge of the second clock signal;

delaying or advancing the second clock signal depending on the detected binary logic value of the first clock signal.

counting the number of times said detecting binary logic value remains the same following occurrence of each of a series of successive edges of the second clock; and declaring that said stable phase relationship has been established when said number of times reaches a predetermined value.

7. A system for testing a transmission link, said transmission link including first and second terminal devices connected by a transmission medium, the first terminal device being coupled to a transmitter for transmitting a test data sequence, and the second terminal device comprising:

an output access;

an input access for connection to a user circuit;

a first clock for determining the timing of data to be supplied to said input access;

a second clock for determining the timing of data received at the output access; and a loop-back circuit for connecting said input and output accesses so as to provide loop-back operation of said system during transmission of a test data sequence;

wherein said second terminal device further comprises means for synchronizing said clocks to enable loop-back operation of said system, and further wherein the loop-back circuit includes a memory device for storing at least part of the test data sequence which is received at said output access while said clocks are being brought into synchronism.

8. The system as claimed in claim 7 wherein said second terminal device is a modem.

9. The system as claimed in claim 4, wherein the first and second clocks respectively produce first and second binary clock signals, and said means for synchronizing the clocks includes means for establishing a stable phase relationship between edges of the first and second clock signals.

* * * * *